UNITED STATES PATENT OFFICE.

FRANK ZIRKLE, OF MECHANICSVILLE, INDIANA.

WHIP-HOLDER.

SPECIFICATION forming part of Letters Patent No. 567,427, dated September 8, 1896.

Application filed December 27, 1895. Serial No. 573,520. (No model.)

*To all whom it may concern:*

Be it known that I, FRANK ZIRKLE, a citizen of the United States, and a resident of Mechanicsville, in the county of Henry and State of Indiana, have invented certain new and useful Improvements in Whip-Holders; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a central vertical section through holder with whip in and locked. Fig. 2 is a central section through main wheel. Fig. 3 is a front view of two intermeshing wheels H and D. Fig. 4 is a rear view of wheel D with inserted parts removed. Fig. 5 shows same with ward D' inserted. Fig. 6 is a perspective figure of ward D'. Fig. 7 shows wheel D with ward $D^2$ placed upon ward D'. Fig. 8 is a perspective view of ward $D^2$. Fig. 9 shows wheel D with outer annular portion $D^3$ placed upon ward $D^2$. Fig. 10 is a perspective view of said outer annular portion. Fig. 11 shows wheel D with keyhole-plate inserted in outer annular portion. Fig. 12 is a perspective view of keyhole-plate. Fig. 13 is a detail view of key. Fig. 14 is a cross-section on line $x\ x$, Fig. 1.

The object of this invention is mainly to provide a whip-holder for vehicles having means whereby a whip may be locked therein in such manner that it cannot be stolen or removed.

With this object in view the invention consists in the novel construction and combination of parts, all as hereinafter described, and pointed out in the appended claims.

Referring to the accompanying drawings, the letter A designates a case or shell having therein a whip-holding socket B. This case or shell may be of any suitable character exteriorly, and is designed to be secured to the dashboard of a vehicle in the usual manner. The socket B consists of a stationary grooved block or plate secured vertically within the case A and of a movable concaved vertical plate B', which at its upper portion is secured to a broad plate-spring C. It is by forcing this spring, and with it the plate B', toward the stationary plate B, whereby the socket is contracted, that the whip is locked.

I will now describe the lock mechanism which I have devised for actuating said spring.

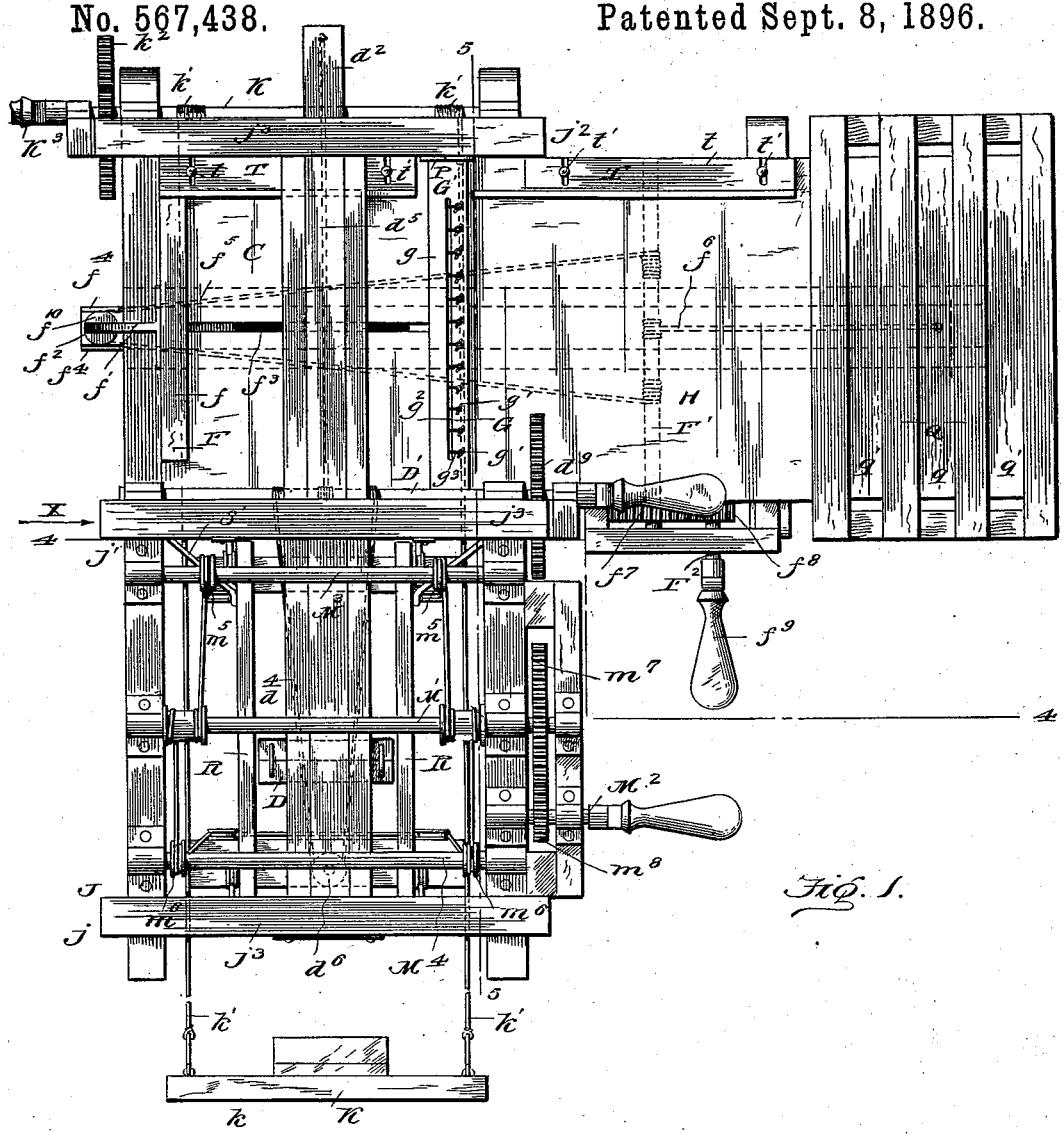

D designates the main or key wheel of the mechanism, and is a compound wheel composed of the main portion D, interior portions or wards D' $D^2$, outer annular portion $D^3$, and keyhole-plate $D^4$. The main part D is hollow on its outer face, being formed with a series of concentric chambers $d\ d'\ d^2$, which are of progressively-increasing diameter from the inner to the outer portion of the wheel. The inner chamber $d$ forms a way for the bits of the key. The chamber $d'$ forms a seat for the flat disk or ward D', which has an opening $d^x$ therethrough for the key. The outer chamber $d^2$ forms a seat for the parts $D^2\ D^3$. The part $D^2$ consists of a circular slotted plate having a hollow cylindric outward extension $d^a$. This part is placed upon the part D', and over it is placed the annular portion $D^3$, which seats loosely but neatly in the chamber $d^2$ and is chambered on its inner face to fit neatly the part $D^2$. The part D' has on its outer face a rim or boss $d^y$, which fits around the outer portion of the extension $d^a$, and which is cut away to form a dovetailed seat for the wedge-shaped keyhole-plate $D^4$, which slides therein and is removable to permit the use of interchangeable plates for varying forms of keys. The parts $D^2\ D^3$ are also designed to be formed with openings or key-slots therein of different forms for the same purpose. Formed in the bottom of the inner chamber $d$ is a narrow transverse recess $d^3$, at the center of which is a small opening $d^4$, which extends through the inner end of the main part D. E is a form of key which may be used, and which has a pin $e$, bits $e'\ e'$, and shoulders $e^2\ e^2$. The main part D has upon its outer peripheral portion a series of cog-teeth $d^5$, one of which is double, and upon its inner end are a series of ratchet-teeth $d^6$. Said inner end has also a central boss $d^7$, in which is the opening $d^4$, above referred to. This compound wheel is journaled horizontally between the parallel sides of a frame F within the case A, the bosses $d^y$ and $d^7$, which engage circular openings in the said frame, forming the journals. The case A is formed